United States Patent [19]

Hallstedt et al.

[11] 4,361,201

[45] Nov. 30, 1982

[54] SAFETY DEVICE FOR SELF-PROPELLED MACHINES

[75] Inventors: Lennart Hallstedt, Lyckeby; Bengt Soderberg, Tving, both of Sweden

[73] Assignee: Dynapac Maskin Aktiebolag, Solna, Sweden

[21] Appl. No.: 197,602

[22] Filed: Oct. 16, 1980

[30] Foreign Application Priority Data

Oct. 22, 1979 [SE] Sweden .............................. 7908733

[51] Int. Cl.$^3$ ............................................ B62D 51/04
[52] U.S. Cl. .................................................. 180/19 H
[58] Field of Search ................. 180/19 H, 19 S, 19 R, 180/20, 272, 315; 404/122

[56] References Cited

U.S. PATENT DOCUMENTS

| 3,147,818 | 9/1964 | Howard et al. | 180/19 R |
|---|---|---|---|
| 4,212,363 | 7/1980 | Letner | 180/19 H |
| 4,224,996 | 9/1980 | Dobberpuhl | 180/272 |
| 4,281,732 | 8/1981 | Hoch | 180/19 H |

FOREIGN PATENT DOCUMENTS 380569 11/1975 Sweden .

*Primary Examiner*—John A. Pekar
*Attorney, Agent, or Firm*—Brumbaugh, Graves, Donohue & Raymond

[57] ABSTRACT

A safety device for a self-propelled machine with a steering rod guided by an operator's handle includes a safety handle positioned proximately below the operator's handle in parallel to at least a portion of the operator's handle for grasping by the operator. The safety handle has first and second arms projecting vertically downward. A shaft is rotatably mounted in the steering rod below the safety handle, and a sleeve is journalled on the shaft. The first and second arms of the safety handle are rigidly attached to opposite ends of the shaft. An operating disc for controlling the motion of the machine is rotatably mounted in the steering rod. A spring normally biases the operating disc to maintain the machine in a stationary position. A locking arm is rigidly attached to the sleeve and engages teeth in the operating disc for securing the operating disc in a fixed position whereby the motion of the machine is constant. The locking arm distributes the mass of the elements pivotal with the safety handle whereby the torque produced by gravitational forces acting upon the safety handle is practically zero when the safety handle is positioned in contact with the operator's handle.

10 Claims, 2 Drawing Figures

SAFETY DEVICE FOR SELF-PROPELLED MACHINES

BACKGROUND OF THE INVENTION

This invention relates to safety devices, and more particularly, to safety devices for self-propelled machines used for compacting earth, asphalt and the like, operated by a driver using a steering rod connected to the machine and walking behind the machine. The safety device is intended to stop the forward or reverse movement of the machine by cutting off the hydraulic fluid to the machine's drive system when the driver releases his grip on the operating handle of the steering rod.

Safety requirements related to the operation of self-propelled machines of various types have increased according to the increase in the use of such machines. This is particularly true of machines of the type known as pedestrian control machines, i.e., machines designed so that the driver does not sit on the machine but walks beside or behind it. If the driver should stumble or lose his grip on the operating handle, there is a considerable risk that the self-propelled machine will continue its progress uncontrolled and seriously injure the driver or other persons nearby or damage the surroundings.

One example of a machine of a type for which the invention is primarily intended is a self-propelled, hydraulically powered, vibrating roller for packing earth, asphalt or the like that is operated with the aid of a steering rod mounted on the rear section of the roller. If the roller is reversed, and the driver stumbles and loses his grip on the operating handle, the roller will continue its reverse movement and may, if it is not equipped with any safety device, cause serious injury to the driver.

Processing machines of this type, which are operated via a steering rod connected to the machine, have been known to be equipped with what is commonly termed a dead man's grip on the operating handle of the steering rod. The dead man's grip consists of a handle which the driver keeps depressed against the operating handle, thus counteracting the pressure from, for example, a spring, as long as the machine is being used.

The dead man's grip, however, becomes tiring for the operator in the long run. In order to avoid such discomfort, proposals have been made, as, for example, in accordance with Swedish Pat. No. 380,569, which use a spring loaded bar in which a spring prevents the bar from assuming a break position so long as the machine is being used and as long as the driver grips the operating handle with his hands. This safety bar will, however, press against the forearms or wrists of the driver all the time. Since the safety bar will strike the driver's arms with a force corresponding to the spring force, the driver's arms will gradually become fatigued. This discomfort is particularly accentuated in the case of vibrating machines.

SUMMARY OF THE INVENTION

An object of the present invention is to provide a safety device which eliminates the inconveniences and discomforts intended with the use of a dead man's grip.

This object, as well as other objects which will become apparent from the discussion that follows, are achieved, according to the present invention, by a dead man's grip which has a suitably designed handle bar. The handle bar is journalled in such a way that it can rotate on a shaft which is, in turn, journalled in the machine's steering rod. The mass of the handle bar is distributed in relation to this shaft in such a way that the torque caused by gravitation acting on the handle bar, when the handle bar is held in the raised position against the operating handle, is practically zero.

For a better understanding of the invention, together with other and further objects, reference is made to the following description taken in conjunction with the accompanying drawings.

DETAILED DESCRIPTION

Figure 1:
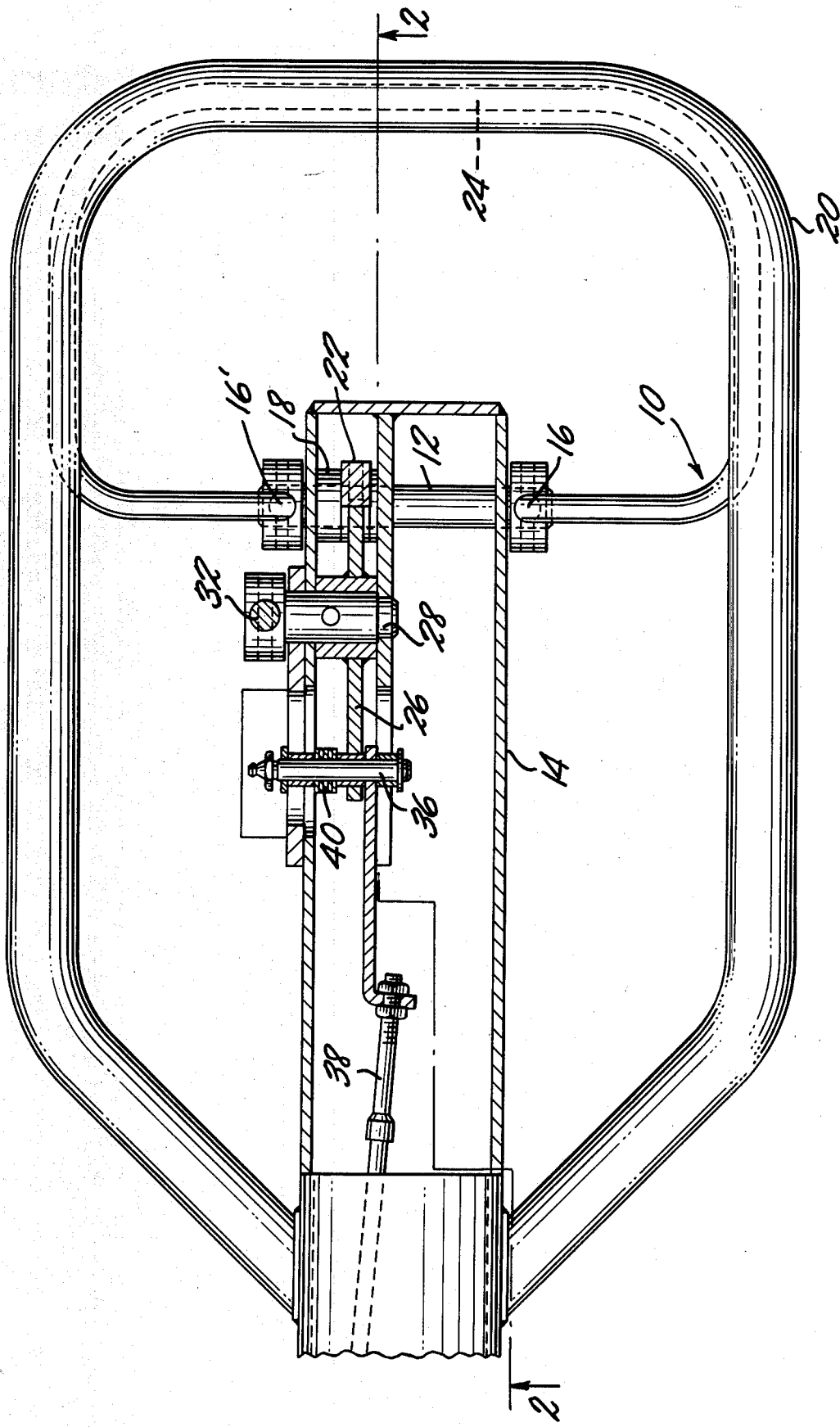
FIG. 1 is a top plan view, partially in section, of the upper end of a steering rod on a hydraulically powered vibration roller provided with a safety handle according to the invention.
Figure 2:
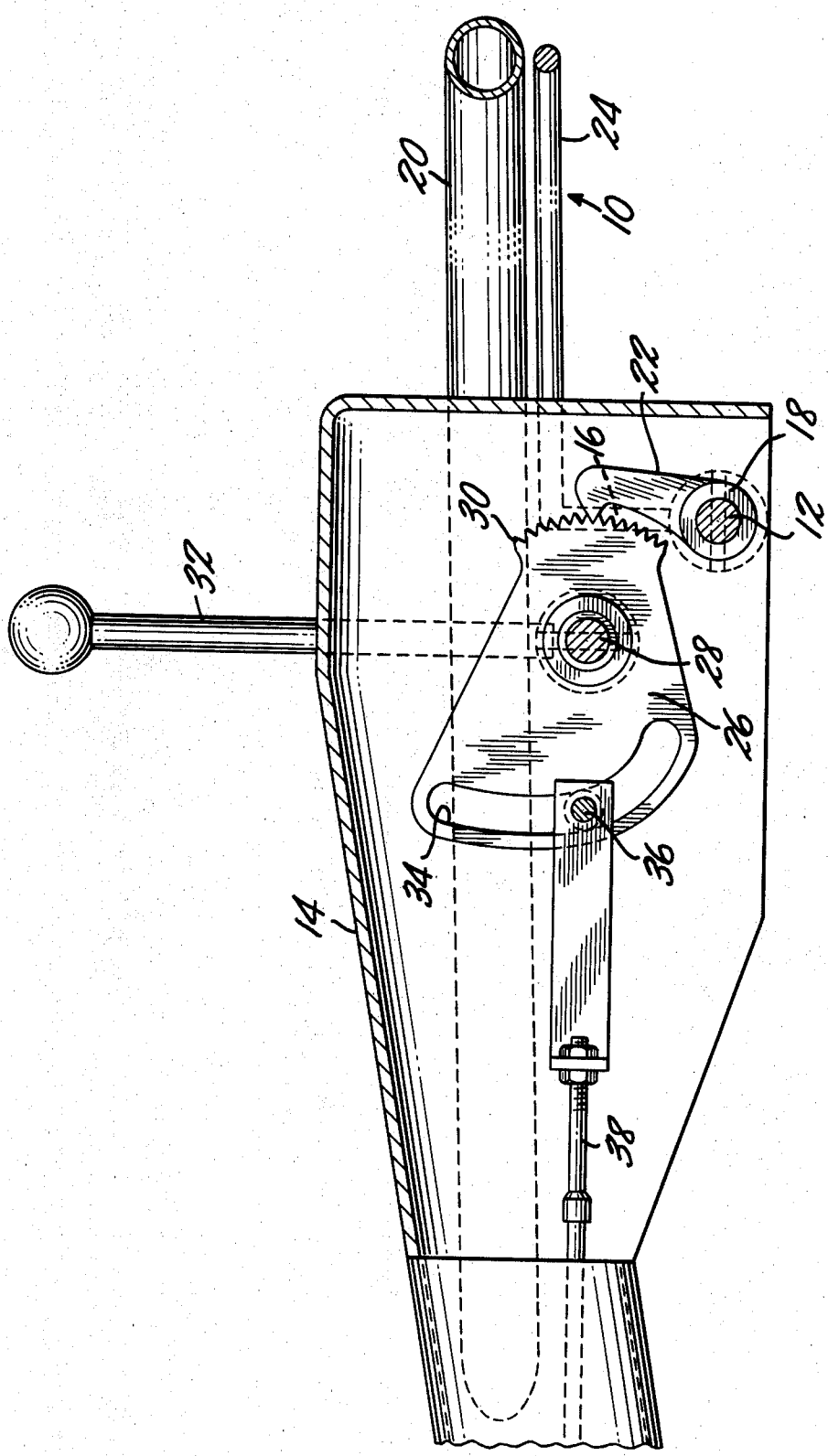
FIG. 2 is a vertical section of the embodiment presented in FIG. 1 taken along the line 2—2.

A safety handle 10 is formed from a bar bent to form a generally U-shaped loop 24, the ends of which are journalled in such a way that they can rotate with a horizontal shaft 12 mounted at its ends at right angles to the roller's steering rod 14. As will be evident to those of skill in the art, the safety handle 10 can be formed of a hollow tube. Both of the ends 16,16' of the handle 10 are bent downwards to form, by and large, a right angle to the plane of the looped tube 10 and are connected to each other by means of the shaft 12, as shown in the drawings. The top end of the steering rod 14 is provided with a horizontal operating handle 20, the top part of which agrees, by and large, with the shape of the safety handle 10. A hook shaped arm 22 is fixed to the sleeve 18 fixed on the shaft 12 and can thus rotate together with the safety handle 10. Hook-shaped arm 22, together with the ends 16,16' and the looped part 24 of the safety handle 10, distributes the mass in such a way that when the safety handle 10 is lifted against the operating handle 20, the mass is in an unstable state of equilibrium due to the fact that the torque, resulting from gravitational forces, around the shaft 12 is practically zero.

The shaft 18 is journalled somewhat under the operating handle 20. Consequently, the looped part 24 of the safety handle 10 is, in the raised position, practically horizontal and parallel to the operating handle 20. The ends 16,16', which are bent downwards are then oriented in a mainly vertical direction in the same way as is the hook-shaped arm 22. Since most of the mass of the parts pivotal with the safety handle 10 is concentrated in the vertical parts, i.e., the ends 16,16' and the hook-shaped arm 22, the force of gravity acting on the safety handle 10 exercises no more than a very small torque around the shaft 12. This means that only small forces are required to keep the safety handle 10 lifted against the operating handle 20.

An operating disc 26 is journalled on a shaft 28 in such a way that it can rotate in the steering rod 14 and is positioned somewhat further in on the steering rod 14. Shaft 28 is parallel to shaft 12. The rear edge of the operating disc 26 has a number of teeth 30 which the hook-shaped arm 22 engages. An operating lever 32 is fixed to the disc 26 and at right angles to the shaft 28. The operating disc 26 can be made to rotate around the shaft 28 by moving the lever 32 backwards and forwards in a vertical plane.

The front part of the operating disc 26 is designed with a curved track 34 in which a guide stud 36, connected to an operating cable 38, is journalled so that it can slide. When the operating disc 26 rotates about shaft 28 with the aid of the operating lever 32, the stud 36 is made to follow the track 34 and causes a longitudinal movement of a cable 38 which, in turn, affects the hydraulic flow to the hydraulic pump (not illustrated) for operating the machine.

The operating disc 26 is spring loaded so that the spring force from a spring 40 always tends to place the operating cable 38 in its home position, in which the machine is stationary. Operating disc 26 and, consequently, the cable 38, can be locked in the desired position with the aid of the hooked-arm 22 when the driver moves the safety handle 10 against the operating handle 20. When the driver releases the safety handle 10, it swings downwards as a result of the force of gravity acting on the safety handle 10. The hook-shaped arm 22 will then release its engagement with the teeth 30. The operating disc 26 will then spring back to its home position and the machine will stop.

Teeth 30 on the operating disc 26 should be such that their interaction with the hook shaped arm 22 does not become self-locking. At the same time as efficient interlocking occurs when the safety handle 10 is raised against the operating handle 20, the hook-shaped arm 22 can be easily disengaged from teeth 30 by the very small torque which acts on the safety handle as a result of the gravitational forces. The torque is not so great that it fatigues the driver even after the machine has been in use for a lengthy period of time. The design of the operating handle 20, and consequently, the safety handle 10, in the form of a loop also facilitates the operation of the machine since the driver can walk beside the machine and grip the operating handle 20 and, consequently, the safety handle 10, with only one hand. The low torque which acts on the safety handle makes it possible for the driver to operate the machine with only one hand without any inconvenience or discomfort.

While only one embodiment of the invention has been described hereinabove, other modifications and substitutions can be made without departing from the spirit and scope of the invention.

We claim:

1. A safety device for a self-propelled machine with a steering rod guided by an operator's handle comprising:
    a safety handle for positioning proximate said operator's handle and having at least one projecting arm;
    a member rotatably mounted with respect to said steering rod, said projecting arm of said safety handle attached to said member for pivotal movement to and from proximate the operator's handle;
    control means controlling movement of the machine;
    cooperating locking means on the control means and the rotatable member for locking the control means in a selected position; and
    the locking means on the rotatable member being secured to said rotating member and pivotal with the safety handle and the rotating member, and positioned with respect to the safety handle and the pivotal axis thereof for distributing the mass of the elements pivotal with said safety handle so that the torque produced by gravitational forces acting upon said safety handle is practically zero when said safety handle is positioned proximate said operator's handle.

2. The device in claim 1 and further comprising control means positioned with respect to said steering rod for regulating the motion of said machine, said locking means engaging said control means to maintain the motion of said machine at a predetermined value.

3. The device in claim 2 wherein said control means is normally biased to maintain said machine in a stationary position.

4. The device in claim 1 wherein said safety handle has a loop-shaped portion parallel to said operator's handle.

5. A safety device for a self-propelled machine with a steering rod guided by an operator's handle comprising:
    a safety handle positioned proximately below said operator's handle and parallel to at least a portion of said operator's handle for grasping by the operator, said safety handle having first and second arms projecting downwardly from said safety handle;
    a member rotatably mounted in said steering rod below said safety handle, said first and second arms of said safety handle rigidly attached to opposite ends of said shaft;
    an operating disc with teeth for controlling the motion of said machine, and rotatably mounted in said steering rod;
    means normally biasing said operating disc to maintain said machine in a stationary position;
    a locking arm rigidly connected with said member and engaging said teeth in said operating disc for securing said operating disc in a fixed position whereby the motion of said machine is constant, said locking arm being connected with said member in a position, relative to the safety handle and a pivotal axis of the safety handle and locking arm, that distributes the mass of the elements pivotal with said safety handle such that the torque produced by gravitational forces acting upon said safety handle is practically zero when said safety handle is pivoted into its position of closest proximity with said operator's handle.

6. The device in claim 5 wherein said safety handle is a U-shaped loop formed of a hollow tube for positioning closely parallel said operator's handle.

7. The device in claim 5 and further comprising a speed control lever upstanding from said operating disc for selecting the motion of said machine.

8. The device in claim 5 wherein said biasing means is a spring.

9. The device in claim 5 wherein said operating disc is an oblong plate journalled on a second shaft rotatably mounted in said steering rod.

10. The device in claim 9 and further comprising:
    a cable connected to the speed control of said machine whereby longitudinal movement of said cable adjusts the speed control;
    a curved track formed in said operating disc;
    a guide stud journalled in said curved track and attached to said cable whereby rotary motion of said control disc effects longitudinal movement of said cable to adjust the speed of said machine.

* * * * *